United States Patent [19]

Back

[11] 4,095,257
[45] June 13, 1978

[54] ORBITER FOR PYROELECTRIC FOCUSING DEVICES

[75] Inventor: Frank G. Back, Glen Cove, N.Y.

[73] Assignee: Zoomar, Inc., Glen Cove, N.Y.

[21] Appl. No.: 724,705

[22] Filed: Sep. 20, 1976

[51] Int. Cl.² .............................................. H04M 3/06
[52] U.S. Cl. .................................... 358/113; 358/205; 358/227; 358/229
[58] Field of Search ............... 358/113, 205, 206, 207, 358/208, 218, 225, 227, 229, 226

[56] References Cited
FOREIGN PATENT DOCUMENTS
2,508,989 1/1975 Germany .............................. 358/113

Primary Examiner—Robert L. Griffin
Assistant Examiner—Edward L. Coles
Attorney, Agent, or Firm—Albert F. Kronman

[57] ABSTRACT

Infrared light from an object directed into a thermal imaging television camera by a lens is passed through an angularly mounted rotating plate to impart orbital motion to the image received upon the image plane of the camera. A variable speed drive is operatively connected to the plate by an elastomeric belt to rotate the plate with a minimum of mechanical vibration. The operator can adjust the speed of the plate's rotation to improve the clarity of the particular scene being televised.

3 Claims, 3 Drawing Figures

ORBITER FOR PYROELECTRIC FOCUSING DEVICES

BACKGROUND OF THE INVENTION

Television cameras for infrared imaging, utilizing a Vidicon tube having a pyroelectric target such as triglycine sulphate are well-known. These cameras form an image by sensing the thermal differences in the scenes before them. The image transmitted by the television camera decays and disappears unless the objects being viewed are constantly moving with respect to the camera target since the heat produced is dissipated at a rapid rate. Prior art devices overcome this difficulty by constantly panning slowly moving scenes, by chopping the entrant light beam or by mechanically orbiting an eccentrically mounted planar wedge or lens carried within the camera so that the image received by the camera is constantly in motion. Such prior art devices are not entirely satisfactory.

Panning or moving the target with a cyclic vibratory motion does not give continuous results since the target must come to a momentary stop at each end of the movement.

A difficulty with prior known mechanical orbiting devices is that the mechanical means employed vibrates the assembly and thereby degrades the thermal image. Another difficulty with such orbiting devices is that their orbiting mechanisms can only work at a fixed speed of rotation. In the present invention, image clarity is improved by varying the speed of rotation of a planar, angularly disposed light transmitting plate to complement the motion in the scene being viewed. A synchronous D. C. motor and an elastomeric belt connected between the motor and the plate is employed to minimize microphonic disturbances.

The present invention rotates the image in a small circular path and produces no more disturbances than if only the trace shadows were rotating. It is simple and easy to install in any infrared camera and does not have any of the disadvantages of the compensating orbiters. The present invention operates with a variable speed control and can be adjusted to the optimum image conditions. Because of its simplicity, it is practically free of repair.

SUMMARY

In the present invention, a flat upright lens support is secured to a pyroelectric focusing device such as a television camera. The lens support is provided with a circular opening within which is carried a planar plate of material highly transparent to infrared radiation. The plate is held by a ring peripherally mounted on bearings. Said plate is mounted in the ring at an angle so that as the plate is turned, it skews continuously with respect to the optical axis of the lens of the television camera to impart an orbital motion to the image. The plate ring is rotatably driven by means of an elastomeric belt coupled to a variable speed D. C. motor. A rheostat controls the potential to the motor so that the operator can vary the speed of rotation.

DESCRIPTION OF THE DRAWING

In the accompanying drawing forming a part hereof, similar parts have been given the same reference numerals, in which drawing.

GENERAL DESCRIPTION

Figure 2:
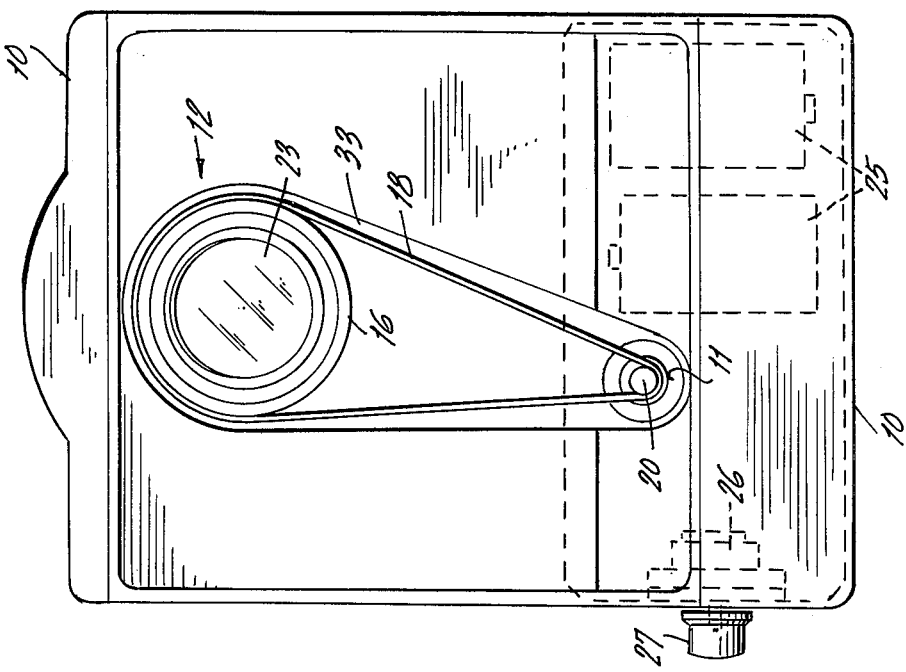
FIG. 2 is a sectional view of the present invention taken along the line 2—2 in FIG. 1 looking in the direction of the arrows.

Referring to the drawings, the orbitor is mounted on a base plate 10 which forms a support for an electric motor 11 and a rotatable mounting 12. The base plate 10 is designed to be mounted on a portion of an infrared focusing device 13 such as a lens, shown in dashed lines, and not a part of the present invention. Another portion 14 of the focusing device which may be a television camera, also shown in dashed lines, supports a pyroelectric target 15, positioned in an image plane of the infrared focusing means. Details of this part of the equipment are not shown since it, too, is not part of the invention and is old in the art. It should be noted that the target, preferably made of triglycine sulphate, is held stationary at all times.

Figure 1:
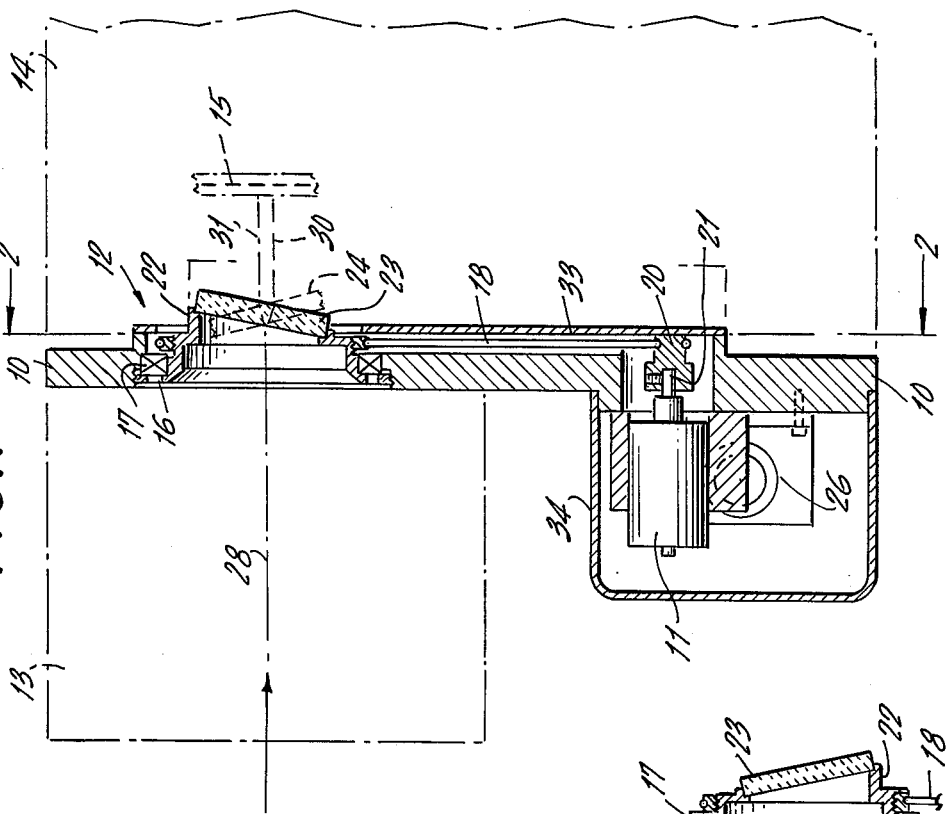
FIG. 1 is a side view, partly in section of a complete embodiment of the present invention.
Figure 3:
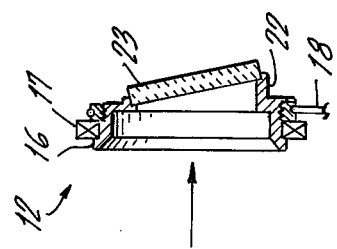
FIG. 3 is a cross sectional view of the mount for the plate shown in FIG. 1 with the plate rotated 180° from the showing in FIG. 1.

The rotatable mounting 12 includes a circular support 16 secured to a ball bearing 17 and positioned so that its axis of rotation coincides with the optical axis of the infrared focusing components. One edge of the support 16 is formed with a groove for holding an elastomer belt 18, made of neoprene, rubber or the like, coupling the support 16 to a small pulley 20, attached to a shaft 21 of motor 11. The support 16 is formed with a cylindrical extension 22 for holding a parallel surface plate 23 of germanium or similar material transparent to infrared radiation. The plate 23 is mounted at an angle, as indicated in FIGS. 1 and 3, so that the entrance and exit surfaces of the plate make an angle of about 10° with the normal plane of the axis of rotation. One position of plate 23 is shown in FIG. 1 in full lines. After a rotation of 180° the plate position is as shown in dotted lines 24.

The motor 11 is a 3 volt direct current motor run by two small batteries 25 (FIG. 2). The batteries 25 are connected in series with a variable resistor 25, manually controlled by a knob 27. An on-off switch (not shown) is preferably coupled to a knob in a manner well-known in the art. Protective guards 33 and 34 are added to cover the belt 18 and motor 11.

When the device is operated, the motor is turned on, the elastomer belt 18 turns support 16 in its ball bearings 17 and the germanium plate 23 is rotated, providing a variable optical displacement for all the infrared focused rays directed to the target. This action causes the image on the target to rotate in a small circular (orbital) path. The generation of the circular path is shown in greater detail in FIG. 1 where an axial ray 28 enters the plate 23 (full lines) and is deflected downwardly during its passage through the plate. When leaving the plate, the ray 30 is restored to its original direction. Nothing is changed except the entire image is displaced a short distance in the target plane. As the plate is rotated, the image continues to be deflected until at 180°, the same ray is deflected to its maximum amount in the opposite direction the result is an orbiting image.

It is evident from the above that the disclosed mechanism rotates only the image. It produces no more disturbance to the image detail than if only the trace shadows were rotating. The variable speed control can be adjusted to the optimum image conditions and is not dependent upon being synchronized with any other motion. The resilient coupling belt eliminates nearly all of the microphonic disturbances which were evident whenever toothed gears were employed in prior art arrangements. Because of its greater simplicity, the present invention requires a minimum of repair and adjustment. It can be added to any infrared pyroelectric camera with a minimum of alterations.

Having thus fully described the invention, what is claimed as new and desired to be secured by Letters Patent of the United States is:

1. An orbiter for pyroelectric focusing devices having an image plane comprising means for focusing infrared radiation upon the image plane; a pyroelectric target positioned in the image plane for showing an image of the focused radiation; a plate, transparent to infrared radiation, mounted in front of the image plane, said plate having parallel inclined entry and exits faces; a rotatable mounting means for said plated disposed normal to the optical axis of the focusing device; means to rotate the mounting means about the optical axis; an adjustable speed control for the said rotating means; and an elastomer belt driven by the rotating means and operatively connected to the mounting means for turning said mounting means.

2. An orbiter according to claim 1 wherein said means to rotate the mounting means is a D. C. motor.

3. An orbiter according to claim 2 wherein a variable speed control is connected to the motor.

* * * * *